US011650221B2

United States Patent
Tocchio et al.

(10) Patent No.: US 11,650,221 B2
(45) Date of Patent: May 16, 2023

(54) MEMS TRI-AXIAL ACCELEROMETER WITH ONE OR MORE DECOUPLING ELEMENTS

(71) Applicant: STMICROELECTRONICS S.r.l., Agrate Brianza (IT)

(72) Inventors: Alessandro Tocchio, Milan (IT); Francesco Rizzini, Passirano (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 231 days.

(21) Appl. No.: 16/986,056

(22) Filed: Aug. 5, 2020

(65) Prior Publication Data

US 2020/0363448 A1    Nov. 19, 2020

Related U.S. Application Data

(62) Division of application No. 15/639,524, filed on Jun. 30, 2017, now Pat. No. 10,768,199.

(30) Foreign Application Priority Data

Nov. 3, 2016    (IT) .................. 102016000110354

(51) Int. Cl.
*G01P 15/18*         (2013.01)
*G01P 15/097*        (2006.01)
(Continued)

(52) U.S. Cl.
CPC ............ *G01P 15/18* (2013.01); *G01P 15/097* (2013.01); *G01P 15/125* (2013.01); *G01P 2015/0845* (2013.01); *G01P 2015/0848* (2013.01)

(58) Field of Classification Search
CPC ...... G01P 15/097; G01P 15/125; G01P 15/18; G01P 2015/0845; G01P 2015/0848; G01P 2015/082
See application file for complete search history.

(56) References Cited

U.S. PATENT DOCUMENTS 9,003,882 B1    4/2015  Ayazi et al.
9,803,980 B2   10/2017  Takizawa
(Continued)

FOREIGN PATENT DOCUMENTS

CN    104459200 A    3/2015
CN    104764903 A    7/2015
(Continued)

*Primary Examiner* — Natalie Huls
(74) *Attorney, Agent, or Firm* — Seed IP Law Group LLP

(57) ABSTRACT

A MEMS tri-axial accelerometer is provided with a sensing structure having: a single inertial mass, with a main extension in a horizontal plane defined by a first horizontal axis and a second horizontal axis and internally defining a first window that traverses it throughout a thickness thereof along a vertical axis orthogonal to the horizontal plane; and a suspension structure, arranged within the window for elastically coupling the inertial mass to a single anchorage element, which is fixed with respect to a substrate and arranged within the window, so that the inertial mass is suspended above the substrate and is able to carry out, by the inertial effect, a first sensing movement, a second sensing movement, and a third sensing movement in respective sensing directions parallel to the first, second, and third horizontal axes following upon detection of a respective acceleration component. In particular, the suspension structure has at least one first decoupling element for decoupling at least one of the first, second, and third sensing movements from the remaining sensing movements.

16 Claims, 6 Drawing Sheets

(51) Int. Cl.
    *G01P 15/125*     (2006.01)
    *G01P 15/08*     (2006.01)

(56) References Cited

U.S. PATENT DOCUMENTS

| | | |
|---|---|---|
| 2005/0274185 A1 | 12/2005 | Lo et al. |
| 2007/0034007 A1 | 2/2007 | Acar et al. |
| 2009/0183570 A1 | 7/2009 | Acar et al. |
| 2009/0272189 A1 | 11/2009 | Acar et al. |
| 2011/0094302 A1 | 4/2011 | Schofield et al. |
| 2013/0192369 A1 | 8/2013 | Acar |
| 2013/0214367 A1 | 8/2013 | van der Heide et al. |
| 2013/0247666 A1 | 9/2013 | Acar |
| 2016/0084654 A1* | 3/2016 | Senkal ............... G01C 19/5747 73/504.12 |
| 2016/0084872 A1 | 3/2016 | Naumann |
| 2016/0370403 A1 | 12/2016 | Merdassi et al. |
| 2017/0261321 A1 | 9/2017 | Zhang |
| 2018/0112981 A1 | 4/2018 | Tocchio |
| 2018/0188336 A1 | 7/2018 | Laghi |

FOREIGN PATENT DOCUMENTS

| | | |
|---|---|---|
| CN | 104931033 A | 9/2015 |
| CN | 105158511 A | 12/2015 |
| CN | 105823906 A | 8/2016 |

\* cited by examiner

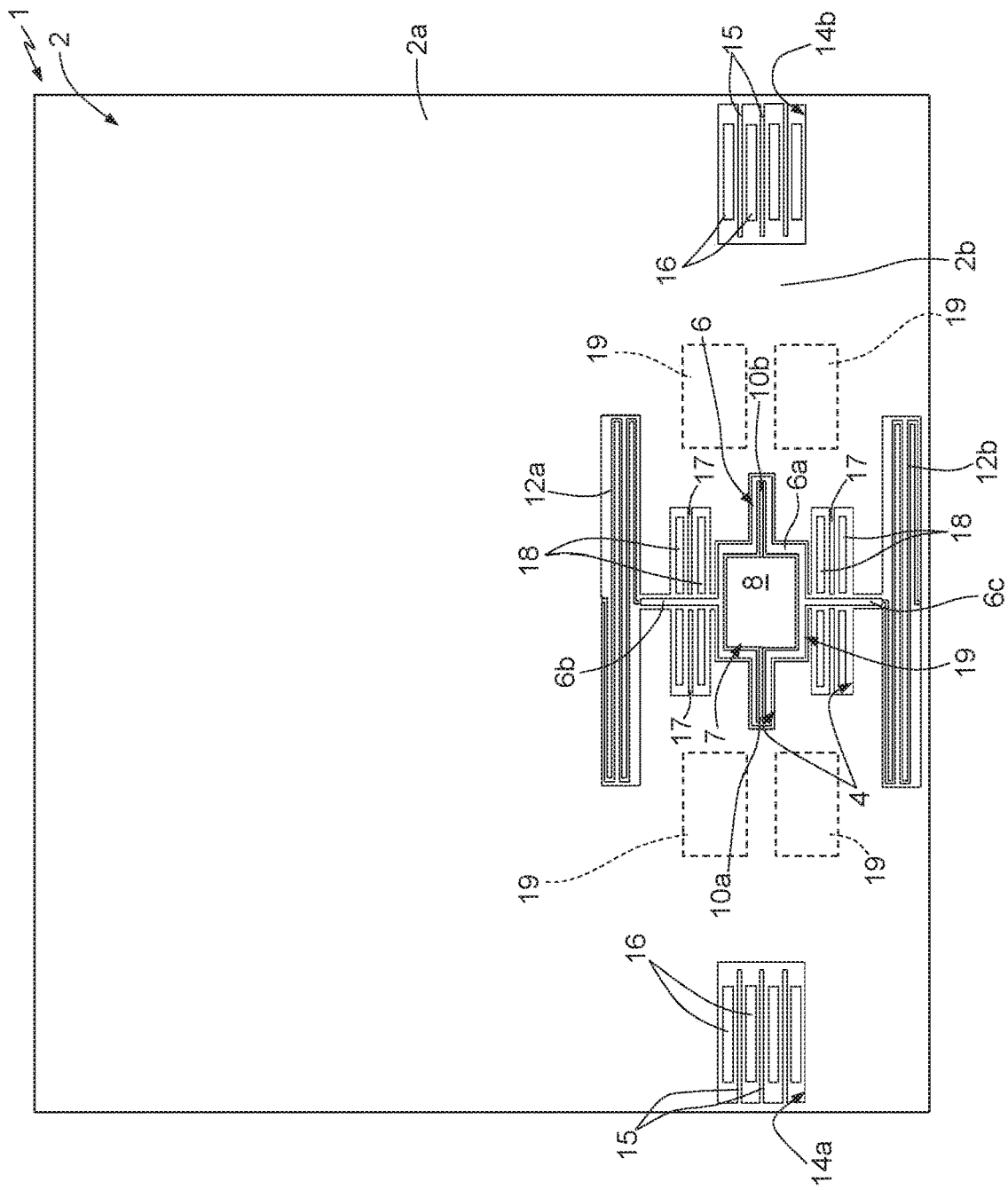

MEMS TRI-AXIAL ACCELEROMETER WITH ONE OR MORE DECOUPLING ELEMENTS

BACKGROUND

Technical Field

The present disclosure relates to a MEMS tri-axial accelerometer with improved configuration.

Description of the Related Art

As it is known, current micromachining techniques enable manufacturing of so-called MEMS (Micro Electro Mechanical System) devices starting from layers of semiconductor material, which have been deposited (for example, a layer of polycrystalline silicon) or grown (for example, an epitaxial layer) on sacrificial layers, which are removed via chemical etching. For example, inertial sensors, accelerometers, and gyroscopes obtained with the above technology are today widely used, for example in the automotive field, in inertial navigation, in the field of portable devices, and in the medical field.

In particular, integrated accelerometers of semiconductor material made with MEMS technology are known, which comprise sensing masses coupled to which are mobile (or rotor) electrodes, which are arranged facing fixed (or stator) electrodes.

The inertial movement of the sensing mass, in response to a linear acceleration in a sensing direction, causes a capacitive variation of the capacitor formed between the mobile electrodes and the fixed electrodes, thus generating an electrical quantity that is variable as a function of the acceleration to be detected.

The frequency of the movement is determined by the acceleration; the amplitude of displacement of the sensing mass is linked to the resonance frequency via the following relation $X=a/\omega^2$, where X is the displacement of the sensing mass, a is the external acceleration applied, and $\omega$ is the resonance frequency expressed in rad/s.

The sensing masses of MEMS accelerometers are arranged above a substrate, suspended by anchoring and suspension structures comprising anchorage elements, fixed with respect to the substrate, and elastic suspension elements, configured to ensure one or more degrees of freedom for the inertial movement of the sensing masses in one or more sensing directions.

In particular, in several applications, it is required to provide a detection of linear accelerations acting in a number of sensing directions, for example along three sensing directions corresponding to the axes of a Cartesian triad. For this purpose, MEMS tri-axial accelerometers may be used, which are able to detect three components of acceleration acting in the three sensing directions.

In various fields, such as the medical field or the field of portable electronic devices, the need is also known to reduce as far as possible the dimensions, with the consequent need to reduce the dimensions of the MEMS tri-axial accelerometers. The size reduction of the sensors, in addition to affecting the overall occupation of area, further enables reduction of the manufacturing costs.

Currently, the majority of MEMS tri-axial accelerometers include a number of sensing masses, typically one sensing mass for each sensing direction. This has the advantage of enabling a design of each sensing mass (and of the coupled sensing electrodes and anchoring and suspension structures) focused and specific for the detection requirements in the respective sensing direction. However, this solution does not enable reduction of the occupation of area and entails in general high manufacturing costs and complexity.

To obtain the aforesaid reduction in dimensions and manufacturing costs, a further known solution envisages the use of a single sensing mass, which is able to detect the components of acceleration in the three sensing directions. In this known solution, the sensing mass is suspended above a substrate via single elastic suspension elements, configured to allow inertial movements in the three sensing directions and determine the resonant vibrational modes thereof.

This solution, albeit enabling a reduction of the area occupation and manufacturing costs, has some disadvantages.

In particular, it is known that the reduction of the planar area of the MEMS accelerometer is directly linked to a mass reduction of the sensing mass, given by:

$$m = \rho \cdot A$$

where m is the mass, $\rho$ is the density of the material, and A is the in-plane area.

It is further known that the mechanical detection sensitivity of the MEMS accelerometer is given by:

$$\frac{dx}{dg} = \frac{m \cdot 9.8}{k}$$

where k is the elastic constant.

A reduction of mass thus entails a reduction in the mechanical sensitivity, which may be compensated by a reduction of the elastic constant k.

However, the elastic constant k may not be reduced beyond a minimum value due to the presence of adhesion forces (the so-called "stiction" phenomenon) between mobile parts and fixed parts of the tri-axial accelerometer structure (these fixed parts being, for example, constituted by stopper elements, designed to limit the movement of the mobile parts to prevent failure thereof).

In particular, to prevent the stiction phenomena, the (mechanical) elastic force has to be greater than the adhesion force, so that the following relation has to be satisfied:

$$F_{mech} > F_{adh}$$

$$k \cdot x_{stop} > F_{adh}$$

where $F_{mech}$ is the elastic force, $F_{adh}$ is the adhesion force, and $x_{stop}$ is the displacement of the sensing mass for reaching the corresponding stopper elements. From this expression a minimum value $k_{min}$ for the elastic constant k is obtained.

In the aforesaid solution, which envisages single elastic elements providing the sensing movements of the single inertial mass in the three sensing directions, it is in general not possible to optimize the sensing performance (in terms, for example, of sensitivity), simultaneously in the three sensing directions. Further, it is difficult to ensure resonance frequencies that are substantially similar for the sensing modes in the above three sensing directions, with consequent further differences of behavior of the accelerometer in regard to the different acceleration components.

BRIEF SUMMARY

The present disclosure is directed to solving, at least in part, the problems previously highlighted, in order to provide an optimized configuration for a MEMS tri-axial accelerometer.

The present disclosure is directed to a MEMS tri-axial accelerometer that includes a single anchorage element fixed to the substrate, a single inertial mass on the substrate, having a main extension in a horizontal plane defined by a first horizontal axis and a second horizontal axis. The mass includes a first window through the mass, a thickness of the mass extending along a vertical axis orthogonal to said horizontal plane, the anchorage element being within the first window and a suspension structure in the first window and configured to elastically couple said inertial mass to the single anchorage element, the suspension structure suspends the inertial mass with respect to the substrate. The mass is configured to perform a first sensing movement in a first sensing direction parallel to said first horizontal axis in response to a first acceleration component, a second sensing movement along a second sensing direction parallel to said second horizontal axis in response to a second acceleration component, and a third sensing movement along a third sensing direction parallel to said vertical axis in response to a third acceleration component. The suspension structure includes a first decoupling element configured to decouple at least one of said first, second, and third sensing movements from the remaining sensing movements of said inertial mass.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIG. 1A shows a schematic top plan view of a sensing structure of a MEMS tri-axial accelerometer according to a first embodiment of the present solution;

DETAILED DESCRIPTION

As will described in detail hereinafter, one aspect of the present solution envisages providing, in the sensing structure of a MEMS tri-axial accelerometer with single inertial mass, at least one first decoupling element, designed to decouple at least one first sensing movement (i.e., one first resonant vibrational mode) of the inertial mass in a respective first sensing direction from the resonant vibrational modes of the same inertial mass in one or more of the other sensing directions. Advantageously, in this way, the characteristics of the first vibrational mode may be designed in an independent way and optimized with respect to the other vibrational modes.

Figure 1B:
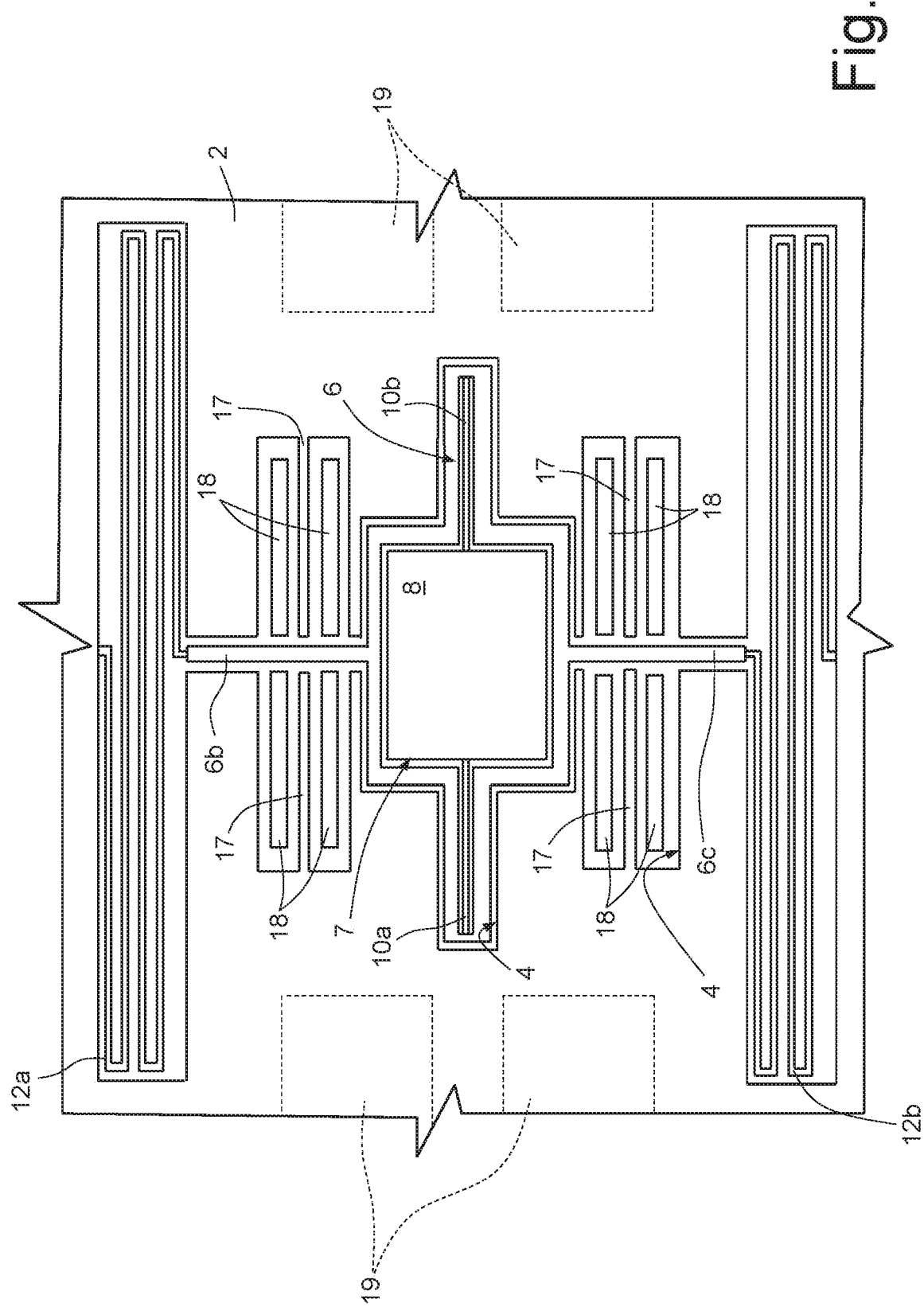
FIG. 1B shows an enlarged schematic top plan view of a portion of the sensing structure of FIG. 1A.

In detail, and with reference to FIGS. 1A and 1, the sensing structure, designated as a whole by 1, of a MEMS tri-axial accelerometer comprises a single inertial mass 2, which has, in the example, a substantially rectangular shape in a horizontal plane xy, defined by a first horizontal axis x and a second horizontal axis y and constituting a plane of main extension for the sensing structure 1 (which has a substantially negligible extension, or in any case a much smaller extension, along a vertical axis z, which defines, with the aforesaid horizontal axes x, y, a Cartesian triad).

It should be noted that, according to the present solution (as, on the other hand, is described in detail hereinafter), the MEMS tri-axial accelerometer has a single inertial mass, i.e., a single mass that is designed, due to inertial effect, to carry out respective sensing movements in the three directions of the tri-axial sensor.

Figure 2A:
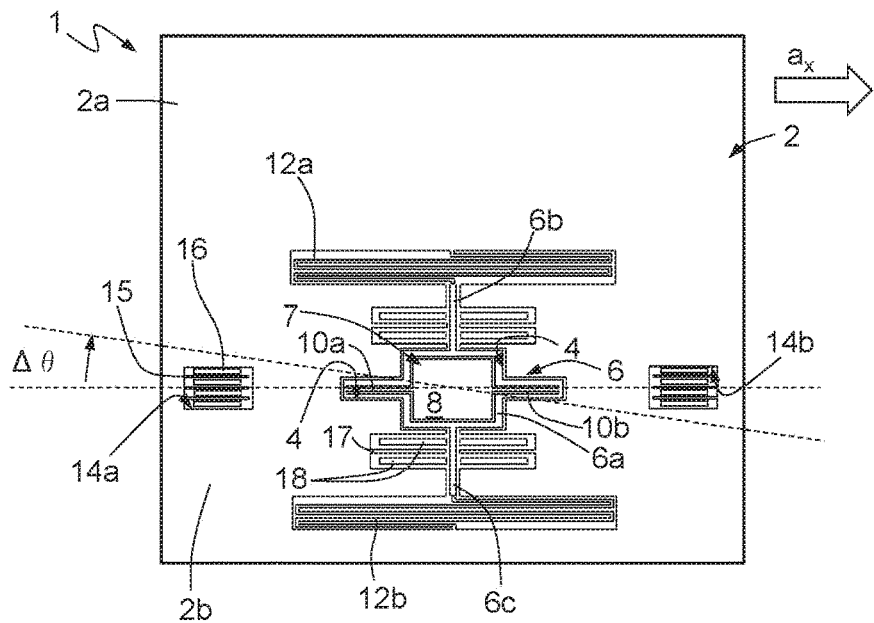
FIGS. 2A-2C are schematic depictions of the sensing movements of the sensing structure of FIG. 1A, in response to respective linear acceleration components.
Figure 2B:
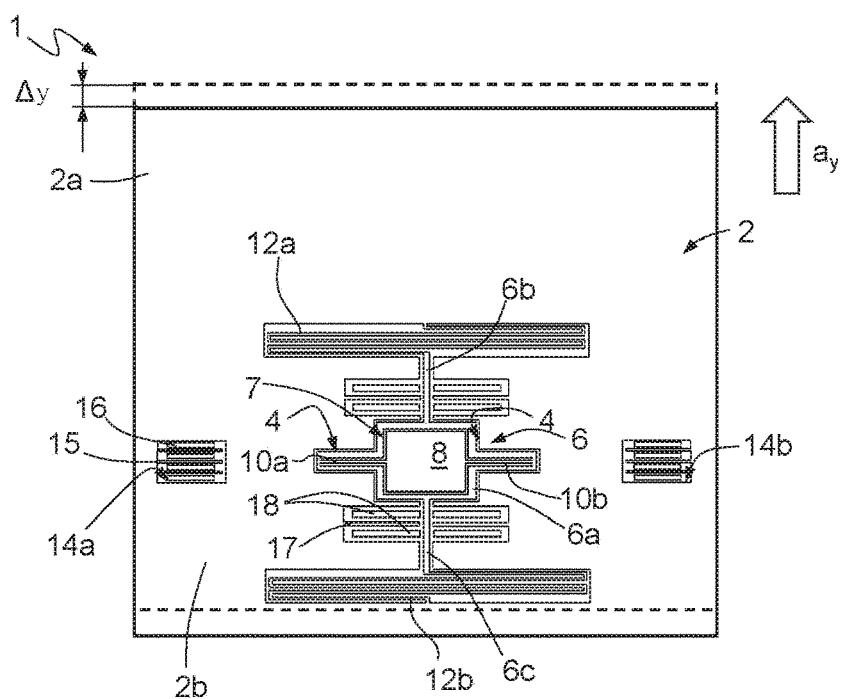
Figure 2C:
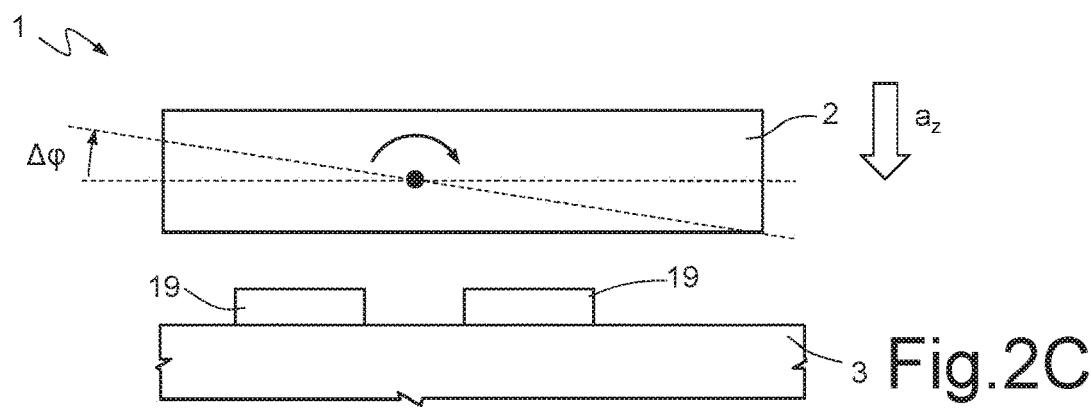

The inertial mass 2 is arranged suspended above a substrate of semiconductor material (shown, for example, in FIG. 2C, where it is designated by 3).

A central window 4 is present within the inertial mass 2 (i.e., within the footprint defined by the inertial mass 2 in the horizontal plane xy); the central window 4 traverses the inertial mass 2 throughout its thickness. In the example shown, the central window 4 has a main extension along the second horizontal axis y, at a central position of the inertial mass 2 with respect to the first horizontal axis x, and has a symmetrical configuration with respect to an axis of symmetry parallel to the same first horizontal axis x.

According to a particular aspect of the present solution, a first decoupling element 6 is arranged within the central window 4, in a central position with respect to the same window.

The first decoupling element 6 has a central portion 6a with a substantially frame-like conformation, defining internally a central empty space 7, in which an anchorage element 8 is arranged, fixed with respect to the substrate 3 (for example, the anchorage element 8 is constituted by a column extending vertically, along the vertical axis z, starting from the aforesaid substrate 3). The anchorage element 8 is arranged at the center of the central empty space 7 and of the central window 4.

The decoupling element 6 is elastically connected to the anchorage element 8 by first elastic elements 10a, 10b, which have a linear extension parallel to the first horizontal axis x and extend on opposite sides with respect to the same anchorage element 8 until they reach a respective inner side of the central portion 6a of the decoupling element 6.

It should be noted that the axis of extension of the first elastic elements 10a, 10b divides the inertial mass 2 into a first portion 2a and a second portion 2b, the first portion 2a having an extension along the second horizontal axis y greater than the corresponding extension of the second portion 2b; the centroid of the inertial mass 2 thus is located within the aforesaid first portion 2a.

The first decoupling element 6 further has prolongation portions 6b, 6c, extending linearly within the central window 4 along the second horizontal axis y, starting from a respective outer side of the central portion 6a of the same decoupling element 6.

The first decoupling element 6 is moreover elastically connected to the inertial mass 2 by second elastic elements 12a, 12b, which extend within the central window 4, between an end portion of a respective prolongation portion 6b, 6c of the first decoupling element 6 and a respective inner side of the inertial mass 2, facing the central window 4.

In particular, in the embodiment illustrated, the second elastic elements 12a, 12b are aligned along the second horizontal axis y, and each has a so-called folded conformation, having a plurality of first portions, parallel to one another, with a linear extension along the first horizontal axis x, connected in pairs by second portions having an extension (much smaller) along the second horizontal axis y.

Two lateral windows 14a, 14b are further defined within the mobile mass 2, arranged on opposite sides of the central window 4 along the first horizontal axis x, at the prolongation of the first elastic elements 10a, 10b. The lateral windows 14a, 14b are arranged at a peripheral portion of the mobile mass 2, in the proximity of the external perimeter of the same mobile mass 2.

The sensing structure 1 further comprises: first mobile electrodes 15, arranged within the lateral windows 14a, 14b, having an extension along the first horizontal axis x and fixedly coupled to the mobile mass 2; and first fixed electrodes 16, which are also arranged within the lateral windows 14a, 14b, are fixedly coupled to the substrate 3 by respective anchorage elements (here not illustrated), and are arranged facing respective first mobile electrodes 15 (in particular, the electrodes are in combfingered configuration).

The sensing structure 1 further comprises: second mobile electrodes 17, arranged within the central window 4, on opposite sides of each prolongation portion 6b, 6c of the first decoupling element 6, also having an extension along the first horizontal axis x and fixedly coupled to the mobile mass 2; and second fixed electrodes 18, which are also arranged within the central window 4, are fixedly coupled to the substrate 3 by respective anchorage elements (not illustrated herein), and are arranged facing, in particular combfingered with, respective second mobile electrodes 17.

The sensing structure 1 further comprises third fixed electrodes 19, fixed with respect to the substrate 3 and arranged above the same substrate 3, underneath the inertial mass 2. The third fixed electrodes 19 are arranged in pairs, on opposite sides of the axis defined by the first elastic elements 10a, 10b, the fixed electrodes 19 of each pair being separated by the central window 4; in the example, the aforesaid fixed electrodes 19 have a substantially rectangular shape in the horizontal plane xy.

The operation of the sensing structure 1 is now described, for inertial sensing of a first acceleration component $a_x$ oriented parallel to the first horizontal axis x, of a second acceleration component $a_y$ oriented parallel to the second horizontal axis y, and of a third acceleration component $a_z$ oriented parallel to the vertical axis z.

In detail, the first acceleration component $a_x$, as illustrated schematically in FIG. 2A, causes a first inertial sensing movement, a rotation of the inertial mass 2 in the horizontal plane xy, about an axis of rotation parallel to the vertical axis z and passing through the center of the anchorage element 8. This rotation, of an angle $\Delta\theta$, is caused by the mass arrangement of the inertial mass 2 with respect to the axis of rotation, having a centroid shifted inside the first portion 2a of the same inertial mass 2.

It should be noted that the aforesaid first sensing movement is allowed by the first elastic elements 10a, 10b, which are compliant to bending in the horizontal plane xy. Moreover, during the aforesaid first movement of the inertial mass 2, the first decoupling element 6 is rigidly coupled to the inertial mass 2, given that the second elastic elements 12a, 12b are rigid with respect to the aforesaid rotation in the horizontal plane xy.

Rotation of the inertial mass 2 thus causes a variation of the facing distance between the first mobile electrodes 15 and the first fixed electrodes 16 (a variation of opposite sign in the two lateral windows 14a, 14b), and a corresponding differential capacitive variation, which may be detected by an appropriate electronic circuitry coupled to the sensing structure 1.

The second acceleration component $a_y$, as illustrated schematically in FIG. 2B, causes a second inertial sensing movement, a translation of the inertial mass 2 along the second horizontal axis y (translation designated by $\Delta y$ in FIG. 2B).

This second sensing movement is allowed by the second elastic elements 12a, 12b, which are compliant along the second horizontal axis y. In particular, during this second movement of the inertial mass 2, the first decoupling element 6 is completely decoupled from the inertial mass 2, given the deformation of the second elastic elements 12a, 12b, and thus remains substantially immobile with respect to the same inertial mass 2.

The aforesaid translation of the inertial mass 2 causes a variation of the facing distance between the second mobile electrodes 17 and the second fixed electrodes 18 (a variation of opposite sign in the electrodes arranged on the opposite side of the anchorage element 8 along the second horizontal axis y), and a corresponding differential capacitive variation, which may be detected by the electronic circuitry coupled to the sensing structure 1.

The third acceleration component $a_z$, as illustrated schematically in FIG. 2C, causes a third inertial sensing movement, a rotation of the inertial mass 2 out of the horizontal plane xy, about the axis defined by the first elastic elements 10a, 10b (rotation designated by $\Delta\varphi$ in FIG. 2C).

In particular, the third sensing movement is once again allowed by the first elastic elements 10a, 10b, which are compliant to torsion. During this third movement of the inertial mass 2, the first decoupling element 6 is coupled to the inertial mass 2, in so far as the second elastic elements 12a, 12b are, instead, rigid with respect to torsion.

The aforesaid rotation of the inertial mass 2 causes a variation of the facing distance between the inertial mass 2 (which in this case acts as a mobile sensing electrode) and the third fixed electrodes 19, and a corresponding differential capacitive variation, which may once again be detected by the electronic circuitry coupled to the sensing structure 1.

Thus, advantageously, the presence of the first decoupling element 6 and of the associated second elastic elements 12a, 12b decouples the vibrational mode of the inertial mass 2 in the second sensing movement (translation along the second horizontal axis y) from the remaining sensing movements and associated vibrational modes. Consequently, said vibrational mode is defined exclusively by the characteristics of the inertial mass 2 and of the second elastic elements 12a, 12b.

Moreover, the use of elastic elements of a folded type (the second elastic elements 12a, 12b) is advantageous, in so far as it allows it to obtain a greater robustness with respect to the manufacturing process spread. In particular, the greater the number of folds (i.e., of parallel portions) of the second elastic elements 12, the greater their width in the plane, thus ensuring a smaller spread in the value of the elastic constant k.

Likewise, the vibrational modes associated to the first sensing movement (in response to the acceleration component $a_x$) and to the third sensing movement (in response to the acceleration component $a_z$) are independent of the aforesaid vibrational mode associated to the second sensing movement, being defined exclusively by the characteristics of the inertial mass 2 (and of the first decoupling element 6) and of the first elastic elements 10a, 10b.

In other words, detection of acceleration along the second horizontal axis y is decoupled from detection of accelerations along the first horizontal axis x and the vertical axis z.

The sensing structure 1 thus has a suspension structure arranged within the central window 4, and comprising the aforesaid first decoupling element 6, the first and second elastic elements 10a-10b, 12a-12b, and the anchorage element 8.

A second embodiment of the present solution is now discussed, envisaging a further degree of decoupling in the detection of the acceleration components $a_x$, $a_y$, and $a_z$, thanks to the introduction, in the suspension structure 29 of the sensing structure 1, of a further decoupling element, co-operating with the first decoupling element 6.

Figure 3:
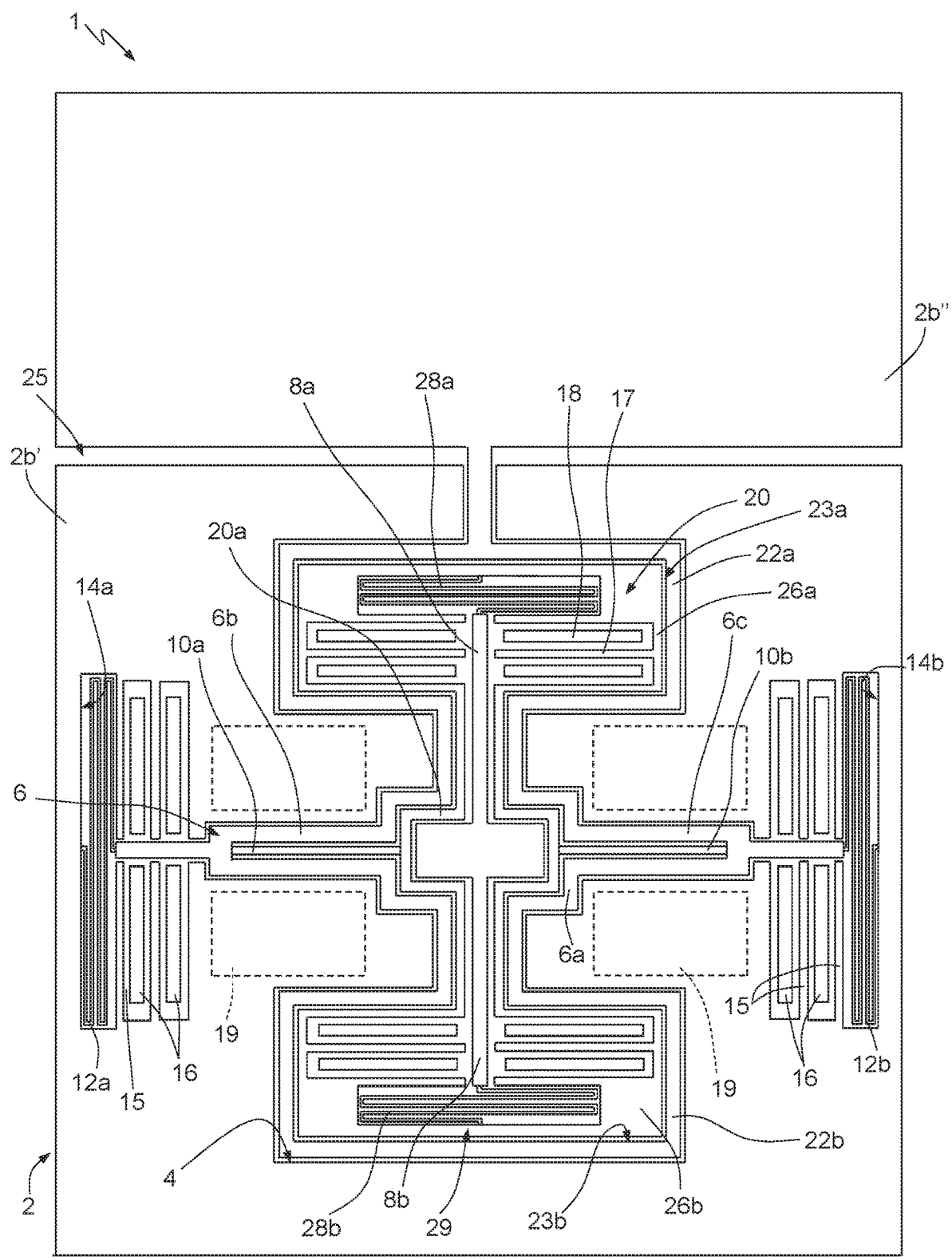
FIG. 3 shows a schematic top plan view of a sensing structure, according to a further embodiment of the present solution.

In detail, as shown in FIG. 3, the first decoupling element 6 of the sensing structure, once again designated as a whole by 1, is in this case connected by the first elastic elements 10a, 10b, having a linear extension parallel to the first horizontal axis x, to a second decoupling element 20. The first decoupling element 6 is further connected to the inertial mass 2 by the second elastic elements 12a, 12b, once again of a folded type, but aligned in this case along the first horizontal axis x.

In detail, the first decoupling element 6 has, also in this case, a central portion 6a with frame-like conformation, from the inner sides of which the first elastic elements 10a, 10b depart, with extension aligned along the first axis x, and defined inside which is the central empty space 7.

In this embodiment, the prolongation portions 6b, 6c have a linear extension within the central window 4 along the first horizontal axis x, starting from a respective outer side of the central portion 6a of the same decoupling element 6, as a prolongation of the first elastic elements 10a, 10b.

The second elastic elements 12a, 12b extend from an end portion of a respective prolongation portion 6b, 6c of the decoupling element 6 up to a respective inner side of the inertial mass 2, which faces the central window 4.

In this case, the aforesaid second elastic elements 12a, 12b once again have a folded conformation, but with the plurality of first portions, which are parallel to one another and have a linear extension along the second horizontal axis y, connected in pairs by second portions having an extension (much smaller), this time along the first horizontal axis x.

The first decoupling element 6 further has lateral portions 22a, 22b, which are fixedly coupled with respect to the corresponding central portion 6a, and extend within the central window 4, on opposite sides with respect to the central empty space 7. Each lateral portion 22a, 22b has a frame-like conformation and internally defines a respective lateral empty space 23a, 23b, which is fluidically connected to the central empty space 7.

According to one aspect of the present embodiment, the second portion 2b of the inertial mass 2 is separated into a first part 2b' and a second part 2b", separated from one another by a gap 25. The first part 2b' is rigidly and fixedly connected to the first portion 2a of the inertial mass 2, whereas the second part 2b" is rigidly connected to the first decoupling element 6.

In detail, the second decoupling element 20 has a conformation substantially equivalent to that of the first decoupling element 6, being housed within the central empty space 7 and the lateral empty spaces 23a, 23b.

Also the second decoupling element 20 thus has a central portion 20a, with frame-like conformation, and lateral portions 26a, 26b, which also have a frame-like conformation, arranged within the respective portions of the first decoupling element 6.

In particular, the second decoupling element 20 internally defines a respective empty space within which the anchorage element 8 is housed.

As previously highlighted, the second decoupling element 20 is elastically connected to the first decoupling element 6 by the first elastic elements 10a, 10b.

In particular, the central portion 20a of the second decoupling element 20 is elastically connected to the central portion 6a of the first decoupling element 6 by the first elastic elements 10a, 10b, which extend starting from outer sides of the central portion 20a of the second decoupling element 20 towards facing inner sides of the respective central portion 6a of the first decoupling element 6.

Furthermore, the second decoupling element 20 is elastically connected to the anchorage element 8, which also in this case is single, for anchoring the sensing structure 1 to the substrate 3.

In particular, third elastic elements 28a, 28b, aligned along the second horizontal axis y, extend from inner sides of the lateral portions 26a, 26b up to prolongations 8a, 8b of the aforesaid anchorage element 8, which are constituted by rigid arms that extend aligned along the aforesaid second horizontal axis y and are rigidly connected to the same anchorage element 8.

Also the aforesaid third elastic elements 28a, 28b have a folded conformation, having a plurality of first portions, parallel to one another, with a linear extension along the first horizontal axis x, connected in pairs by second portions having an extension (much smaller) along the second horizontal axis y.

In this embodiment, the second mobile electrodes 17 are rigidly connected to inner sides of the lateral portions 26a, 26b of the second decoupling element 20, facing the respective second fixed electrodes 18, which are arranged, like the aforesaid second mobile electrodes 17, within the empty spaces defined internally by the same lateral portions 26a, 26b.

The mode of operation of the sensing structure 1 of FIG. 3 is now described, for inertial sensing of the first acceleration component $a_x$ oriented parallel to the first horizontal axis x, of the second acceleration component $a_y$ oriented parallel to the second horizontal axis y, and of the third acceleration component $a_z$ oriented parallel to the vertical axis z.

Figure 4A:
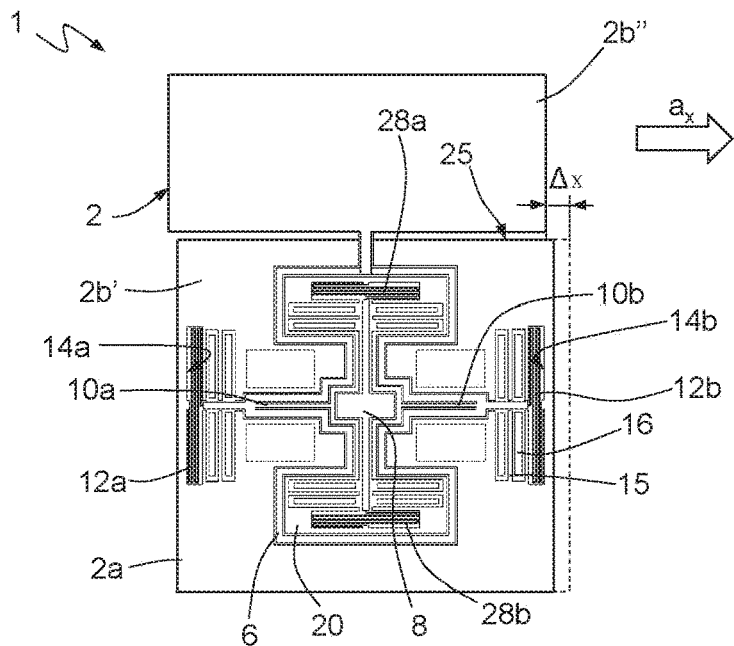
FIGS. 4A-4C are schematic representations of the sensing movements of the sensing structure of FIG. 3, in response to respective linear acceleration components.

In detail, the first acceleration component $a_x$, as illustrated schematically in FIG. 4A, causes a first inertial sensing movement of the inertial mass 2 in the horizontal plane xy, in this case constituted by a translation Δx parallel to the first horizontal axis x of the corresponding first portion 2a and of the first part 2b' of the second portion 2b. This translation is allowed by the second elastic elements 12a, 12b, which are compliant to tensile forces in the horizontal plane xy along the aforesaid first horizontal axis x.

The first decoupling element 6 decouples the first movement of the inertial mass 2 so that the same first decoupling element 6, the second decoupling element 20, and the second part 2b" of the second portion 2b of the inertial mass 2 are substantially immobile. In particular, both the first elastic elements 10a, 10b and the third elastic elements 28a, 28b are rigid with respect to the movement of translation along the first horizontal axis x.

The aforesaid first sensing movement thus causes a variation of the facing distance between the first mobile electrodes 15 and the first fixed electrodes 16 (a variation of opposite sign in the two lateral windows 14a, 14b), and a corresponding differential capacitive variation, which may be detected by an appropriate electronic circuitry coupled to the sensing structure 1.

Figure 4B:
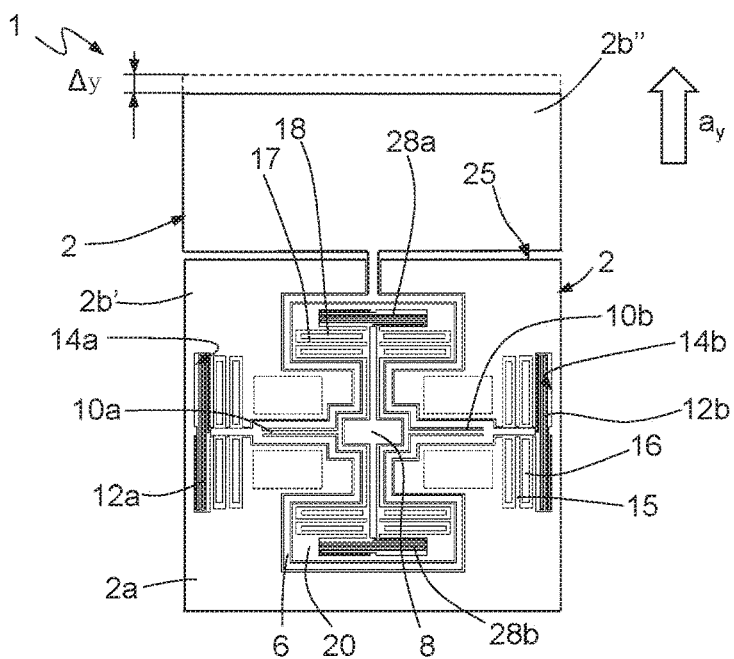

The second acceleration component $a_y$, as illustrated schematically in FIG. 4B, causes a second inertial sensing movement, of translation of the inertial mass 2 along the second horizontal axis y (translation designated once again by Δy). This second sensing movement is allowed by the third elastic elements 28a, 28b, which are compliant to tensile forces along the second horizontal axis y.

Instead, both the first elastic elements 10a, 10b and the second elastic elements 12a, 12b are rigid with respect to this translation, so that the first portion 2a and the second portion 2b (comprising the first and second parts 2b', 2b'') of the inertial mass 2 are rigidly and fixedly connected to one another. In other words, the entire inertial mass 2 and the first and second decoupling elements 6, 20 move fixedly with respect to one another in the translation along the second horizontal axis y.

This translation causes a variation of the facing distance between the second mobile electrodes 17 and the second fixed electrodes 18 (a variation of opposite sign in the electrodes arranged on the opposite side of the anchorage element 8 along the second horizontal axis y), and a corresponding differential capacitive variation, which may be detected by the electronic circuitry coupled to the sensing structure 1.

Figure 4C:
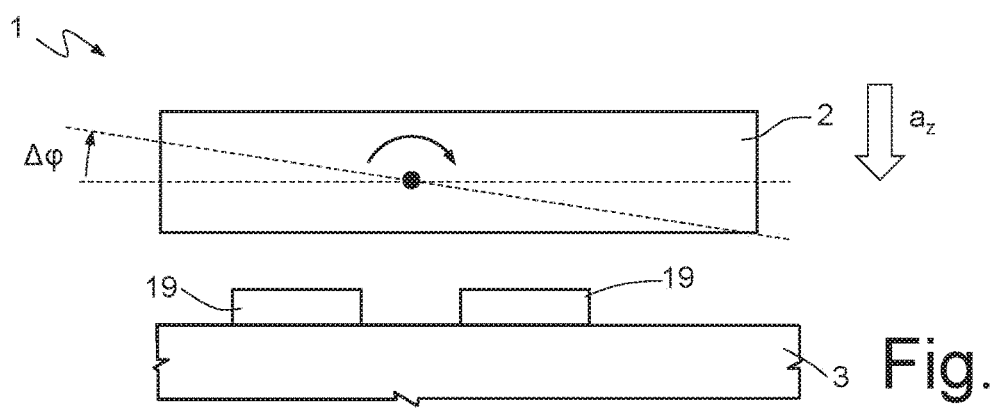

The third acceleration component $a_z$, as illustrated schematically in FIG. 4C, causes a third inertial sensing movement, of rotation of the entire inertial mass 2 (comprising the first and second portions 2a, 2b) out of the horizontal plane xy, about the axis defined by the first elastic elements 10a, 10b (rotation designated by Δφ in FIG. 4C). In particular, this third sensing movement is allowed by the first elastic elements 10a, 10b, which are compliant to torsion.

Given the stiffness both of the second elastic elements 12a-12b and of the third elastic elements 28a-28b with respect to torsion, during the aforesaid third sensing movement, the first decoupling element 6 is again coupled to the inertial mass 2, whereas the second decoupling element 20 is decoupled from the inertial mass 2 and from its rotation movement, remaining substantially immobile.

The aforesaid rotation of the inertial mass 2 causes a variation of the facing distance between the inertial mass 2 (which, in this case, acts as the mobile sensing electrode) and the third fixed electrodes 19, and a corresponding differential capacitive variation, which may once again be detected by the electronic circuitry coupled to the sensing structure 1.

Thus, advantageously, the joint presence of the first and second decoupling elements 6, 20 and of the associated elastic elements decouples each vibrational mode of the inertial mass 2 with respect to the other vibrational modes. The vibrational modes may thus be designed independently, and consequently independently optimized to obtain the desired sensing performance.

In particular, the first sensing movement (translation along the first horizontal axis x) is defined exclusively by the characteristics of the first portion 2a and of the first part 2b' of the second portion 2b of the inertial mass 2 and by the characteristics of the second elastic elements 12a, 12b; the second sensing movement (translation along the second horizontal axis y) is defined by the characteristics of the entire inertial mass 2 (and of the first and second decoupling elements 6, 20) and by the characteristics of the third elastic elements 28a, 28b; and the third sensing movement (rotation out of the horizontal plane xy) is defined by the characteristics of the entire inertial mass 2 (and of the first decoupling element 6) and by the characteristics of the first elastic elements 10a, 10b.

In yet other words, detection of each acceleration component along the respective sensing axis is independently determined by the respective elastic elements; namely: detection of the acceleration component $a_x$ along the first horizontal axis x is determined by the second elastic elements 12a, 12b; detection of the acceleration component $a_y$ along the second horizontal axis y is determined by the third elastic elements 28a, 28b; and detection of the acceleration component $a_z$ along the vertical axis z is determined by the first elastic elements 10a, 10b.

In particular, also in this case it is advantageous to use folded elastic elements to define the vibrational modes for detection along the first and second horizontal axes x, y (respectively, the second elastic elements 12a, 12b and the third elastic elements 28a, 28b).

The advantages of the MEMS tri-axial accelerometer emerge clearly from the foregoing description.

In any case, it is once again emphasized that the solution described, with the introduction of at least one decoupling element in the sensing structure, enables to decouple from one another the vibrational modes corresponding to detection of the acceleration components, and in particular decoupling of at least one vibrational mode (and detection of the associated acceleration component) from the remaining vibrational modes (and detection of the remaining acceleration components).

The sensing structure 1, which comprises in any case a single inertial mass 2 for detecting the three acceleration components, is particularly compact and leads to reduced manufacturing costs.

In particular, the aforesaid sensing mass may also be reduced in size, without on the other hand reducing the sensing performance (for example, in terms of sensitivity), thanks to the possibility of optimizing in an independent way the mechanical characteristics of detection along the three sensing axes (for example, optimizing the value of the elastic constant k of the corresponding elastic elements).

Figure 5:
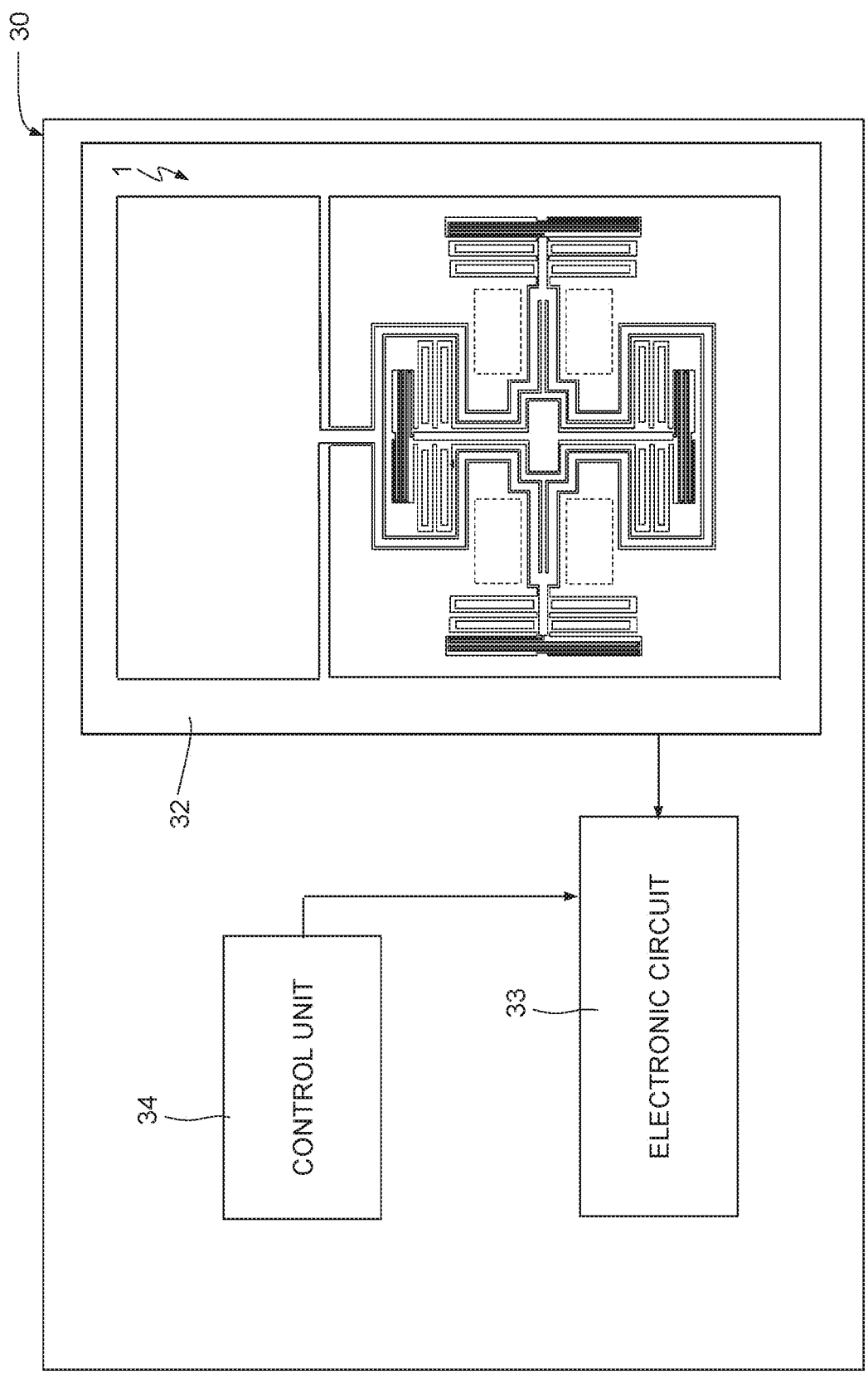
FIG. 5 shows a general block diagram of an electronic device incorporating the MEMS tri-axial accelerometer, according to a further aspect of the present solution.

Basically, the aforesaid characteristics render the MEMS tri-axial accelerometer particularly indicated for integration in an electronic device 30, as shown in FIG. 5, which may be used in a plurality of electronic systems, for example in inertial navigation systems, in automotive systems or in systems of a portable type, such as: a PDA (Personal Digital Assistant); a portable computer; a cellphone; a digital audio player; or a photographic camera or video camera. The electronic device 30 is generally able to process, store, transmit, and receive signals and information.

The electronic device 30 comprises: the MEMS tri-axial accelerometer, here designated by 32; an electronic circuit 33, operatively coupled to the MEMS tri-axial accelerometer 32, to supply biasing signals to the sensing structure 1 (in a per se known manner, not illustrated in detail herein) and to detect the displacements of the sensing mass and thus determine the accelerations acting on the same structure; and an electronic control unit 34, for example a microprocessor unit, connected to the electronic circuit 33, and designed to supervise general operation of the electronic device 30, for example on the basis of the accelerations detected and determined.

Finally, it is clear that modifications and variations may be made to what has been described and illustrated herein, without thereby departing from the scope of the present disclosure.

For example, it is highlighted that the particular conformation and configuration of the sensing mass and of the elastic elements in the sensing structure 1 may vary with respect to what has been illustrated.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a substrate;
   an anchor on the substrate;
   a decoupling element including:
      a plurality of first portions surrounding the anchor;
      a plurality of second portions extending outward from the plurality of first portions; and
      a plurality of third portions extending from the plurality first portions transverse to the plurality of second portions;
   a plurality of first elastic coupling elements, each one of the plurality of first elastic coupling elements is coupled to one of the plurality of first portions of the decoupling element;
   a plurality of second elastic coupling elements, each one of the plurality of second elastic coupling elements is coupled to one of the plurality of second portions of the decoupling element;
   a first and second plurality of fixed electrodes on the substrate;
   an inertial mass including:
      a first portion;
      a second portion that is larger than the first portion;
      a first opening in the first portion, and the decoupling element, the anchor and the first and second elastic coupling elements are within the first opening, the decoupling element is coupled to the mass by the plurality of first elastic coupling elements, and the decoupling element is coupled to the anchor by the plurality of second elastic coupling elements;
      a first and second plurality of mobile electrodes extend from the mass;
      a second opening, and the first plurality of fixed electrodes and the first plurality of mobile electrodes are in the second opening; and
      a third opening separated from the second opening by the first opening, the second plurality of fixed electrodes and the second plurality of mobile electrodes are in the third opening.

2. The device of claim 1, wherein:
   the mass further includes further comprising:
      a plurality of third mobile electrodes at a first side of the anchorage; and
      a plurality of fourth mobile electrodes at a second side of the anchorage opposite to the first side.

3. The device of claim 2, further comprising:
   a plurality of third fixed electrodes on the substrate, at the first side of the anchorage, and in electrical communication with the plurality of third mobile electrodes; and
   a plurality of fourth fixed electrodes on the substrate, at the second side of the anchorage, and in electrical communication with the plurality of fourth mobile electrodes.

4. A device, comprising:
   a substrate;
   an inertial mass;
   an anchor coupled to the substrate, the anchor including a center;
   a decoupling element including:
      a first portion surrounding the anchor;
      a second portion extending outward from the first portion; and
      a third portion extending outward from the first portion transverse to the second portion;
   a first elastic element coupling the first portion of the decoupling element to the anchor; and
   a second elastic element;
   an inertial mass surrounds the decoupling element, the anchor, the first elastic element, and the second elastic element, the inertial mass is coupled to the second portion by the second elastic element, the inertial mass includes:
      a center spaced apart from the center of the anchor;
      a first portion with a first dimension extending from the first elastic element to a first end of the inertial mass;
      a second portion with a second dimension extending from the first elastic element to a second end of the inertial mass opposite to the first end, the second dimension being less than the first dimension; and
      a centroid of the inertial mass within the first portion of the inertial mass.

5. The device of claim 4, wherein:
   the first elastic element is configured to extend in a first direction; and
   the second elastic element further comprises:
      a plurality of first portions substantially parallel with each other configured to extend in the first direction; and
      a plurality of second portions transverse to the plurality of first portions coupling the plurality of first portions to each other, the plurality of second portions configured to extend in a second direction transverse to the first direction.

6. The device of claim 4, wherein the inertial mass further comprises:
   a first opening surrounding the anchor, the decoupling element, the first elastic element, and the second elastic element; and
   a second opening laterally spaced apart from the first opening.

7. The device of claim 6, further comprising:
   a first mobile electrode extending from the inertial mass and within the second opening;
   a first fixed electrode extending from the substrate and within the second opening, the first fixed electrode electrically coupled to the first mobile electrode;
   a second mobile electrode extending from the inertial mass and within the first opening;
   a second fixed electrode extending from the substrate and within the first opening, the second fixed electrode electrically coupled to the second mobile electrode; and
   a third fixed electrode on the substrate between the substrate and the inertial mass, the third fixed electrode is electrically coupled to the inertial mass.

8. The device of claim 4, wherein the decoupling element further comprises:

a fourth portion extending outward from the first portion opposite to the second portion; and a fifth portion extending outward from the first portion opposite to the third portion.

9. A device, comprising:
a substrate including a surface;
an inertial mass overlapping and spaced apart from the surface of the substrate;
an anchor coupled to the substrate;
a decoupling element including:
    a first portion surrounding the anchor;
    a second portion extending outward from the first portion; and
    a third portion extending outward from the first portion transverse to the second portion;
    a fourth portion extending outward from the first portion opposite to the second portion; and
    a fifth portion extending outward from the first portion opposite to the third portion;
a first elastic element coupling the first portion of the decoupling element to the anchor;
a second elastic element coupling the second portion of the decoupling element to the inertial mass;
a third elastic element coupling the fourth portion of the decoupling element to anchor;
a fourth elastic coupling element coupling the fifth portion of the decoupling element to the inertial mass; and
a plurality of first fixed electrodes on the surface of the substrate, the plurality of first fixed electrodes are between the surface of the substrate, and the inertial mass, and the plurality of first fixed electrodes are in electrical communication with the inertial mass.

10. The device of claim 9, wherein the inertial mass includes: a plurality of first mobile electrodes spaced laterally outward from the third portion of the decoupling element; a plurality of second mobile electrodes spaced laterally outward from the fifth portion of the elastic decoupling element.

11. The device of claim 10, further comprising:
a plurality of second fixed electrodes on the substrate, the plurality of second fixed electrodes are in electrical communication with the plurality first mobile electrodes; and
a plurality of third fixed electrodes on the substrate, the plurality of third fixed electrodes are in electrical communication with the plurality of second mobile electrodes.

12. The device of claim 11, wherein the inertial mass includes a first opening that surrounds the anchor, the decoupling element, the first elastic element, the second elastic element, the third elastic element, the fourth elastic element, the plurality of second fixed electrodes, and the plurality of third fixed electrodes.

13. The device of claim 9, wherein the inertial mass includes a first opening surrounding the anchor, the decoupling element, the first elastic element, and the second elastic element.

14. The device of claim 13, wherein the inertial mass further includes:
a second opening spaced apart from the first opening, the second opening is on a first side of the first opening; and
a third opening spaced apart from the first opening, the third opening is on a second side of the first opening opposite to the first side of the first opening.

15. The device of claim 14, wherein a first one of the plurality of first fixed electrodes is between the first opening and the second opening, and a second one of the plurality of first fixed electrodes is between the first opening and the second opening.

16. The device of claim 14, further comprising:
a plurality of second fixed electrodes on the substrate and within the second opening; and
a plurality of third fixed electrodes on the substrate and within the third opening,
wherein the inertial mass further includes:
    a plurality of first mobile electrodes in the second opening and in electrical communication with the plurality of second fixed electrodes; and
    a plurality of second mobile electrode in the third opening and in electrical communication with the plurality of third fixed electrodes.

* * * * *

UNITED STATES PATENT AND TRADEMARK OFFICE
CERTIFICATE OF CORRECTION

PATENT NO. : 11,650,221 B2  
APPLICATION NO. : 16/986056  
DATED : May 16, 2023  
INVENTOR(S) : Alessandro Tocchio et al.

Page 1 of 1

It is certified that error appears in the above-identified patent and that said Letters Patent is hereby corrected as shown below:

In the Claims

Column 11, Claim 1, Lines 26-27:
"plurality first portions" should read: -- plurality of first portions --.

Column 13, Claim 11, Line 41:
"plurality first" should read: -- plurality of first --.

Signed and Sealed this
Eleventh Day of July, 2023

Katherine Kelly Vidal  
*Director of the United States Patent and Trademark Office*